US012290914B2

(12) United States Patent
Schwei

(10) Patent No.: US 12,290,914 B2
(45) Date of Patent: May 6, 2025

(54) MOUNTING RAILS FOR MODULAR SYSTEM

(71) Applicant: Milwaukee Electric Tool Corporation, Brookfield, WI (US)

(72) Inventor: Hunter M. Schwei, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/357,783

(22) Filed: Jul. 24, 2023

(65) Prior Publication Data

US 2024/0009829 A1 Jan. 11, 2024

Related U.S. Application Data

(63) Continuation of application No. PCT/US2023/027263, filed on Jul. 10, 2023.

(60) Provisional application No. 63/400,547, filed on Aug. 24, 2022, provisional application No. 63/388,064, filed on Jul. 11, 2022.

(51) Int. Cl.
*B25H 3/04* (2006.01)
*A47B 47/00* (2006.01)

(52) U.S. Cl.
CPC ........... *B25H 3/04* (2013.01); *A47B 47/0091* (2013.01)

(58) Field of Classification Search
CPC ...... B25H 3/02; A47B 47/0091; F16M 11/04; F16M 13/00; F16M 11/00
See application file for complete search history.

(56) References Cited

U.S. PATENT DOCUMENTS

| | | | | |
|---|---|---|---|---|
| 3,424,334 | A | 1/1969 | Goltz | |
| 4,113,329 | A * | 9/1978 | Thurman | B65D 21/0213 206/509 |
| 4,531,645 | A * | 7/1985 | Tisbo | B25H 3/06 211/163 |
| 4,618,192 | A | 10/1986 | Kelley | |
| 5,244,265 | A * | 9/1993 | Chiang | B25H 3/023 312/902 |
| 5,890,613 | A | 4/1999 | Williams | |
| 6,945,414 | B1 | 9/2005 | Stevens et al. | |
| 6,983,946 | B2 | 1/2006 | Sullivan et al. | |
| 8,740,010 | B1 | 6/2014 | Page | |
| 9,375,835 | B1 | 6/2016 | Lin | |
| 10,222,172 | B2 * | 3/2019 | Melville | F41C 33/041 |

(Continued)

FOREIGN PATENT DOCUMENTS

| | | |
|---|---|---|
| CN | 210417354 U | 4/2020 |
| DE | 4447208 | 7/1998 |

(Continued)

OTHER PUBLICATIONS

International Search Report and Written Opinion for International Application No. PCT/US2023/027263 dated Oct. 27, 2023, 11 pages.

*Primary Examiner* — Monica E Millner
(74) *Attorney, Agent, or Firm* — Reinhart Boerner Van Deuren s.c.

(57) ABSTRACT

One or more support platforms for a modular system are provided. The support platforms are configured to detachably couple to a wall and with utility modules in a system, such as modular tool storage units, thereby coupling and/or storing the utility modules against the wall.

19 Claims, 6 Drawing Sheets

(56) References Cited

U.S. PATENT DOCUMENTS

| | | | | |
|---|---|---|---|---|
| 10,583,962 | B2 | 3/2020 | Brunner et al. | |
| 10,750,833 | B2 | 8/2020 | Burchia | |
| 10,933,501 | B2 * | 3/2021 | Bisson | B23Q 15/06 |
| 11,034,370 | B2 * | 6/2021 | Cao | B62B 3/022 |
| 11,385,055 | B2 * | 7/2022 | Millane | G01C 15/002 |
| 11,426,859 | B2 * | 8/2022 | Squiers | A45F 3/047 |
| 11,612,998 | B1 * | 3/2023 | Byington | B25H 3/028 211/126.1 |
| 11,649,921 | B1 * | 5/2023 | Carpenter | F16M 11/22 248/346.03 |
| 11,957,245 | B2 * | 4/2024 | Barton | A47C 7/626 |
| 12,036,660 | B2 * | 7/2024 | Groves | B25H 1/16 |
| 2003/0139080 | A1 | 7/2003 | Lafragette et al. | |
| 2007/0138041 | A1 | 6/2007 | Welsh | |
| 2007/0262037 | A1 | 11/2007 | Cheng | |
| 2010/0327134 | A1 * | 12/2010 | Lundrigan | F16M 13/022 248/220.31 |
| 2011/0260588 | A1 | 10/2011 | Lin | |
| 2013/0127129 | A1 | 5/2013 | Bensman et al. | |
| 2014/0265440 | A1 | 9/2014 | Chen et al. | |
| 2017/0166352 | A1 | 6/2017 | Hoppe et al. | |
| 2019/0225371 | A1 | 7/2019 | Hoppe et al. | |
| 2019/0351540 | A1 * | 11/2019 | Lamb | B25H 3/023 |
| 2020/0147781 | A1 | 5/2020 | Squiers et al. | |
| 2020/0165036 | A1 | 5/2020 | Squiers et al. | |
| 2021/0025706 | A1 | 1/2021 | Millane | |
| 2022/0089421 | A1 | 3/2022 | Hargis et al. | |
| 2022/0097926 | A1 | 3/2022 | Whitmire et al. | |
| 2023/0122425 | A1 | 4/2023 | Camp et al. | |
| 2024/0010390 | A1 * | 1/2024 | Braun | A47B 57/10 |

FOREIGN PATENT DOCUMENTS

| | | | |
|---|---|---|---|
| DE | 20100181 | | 7/2001 |
| DE | 202014103695 | | 10/2014 |
| DE | 102015112035 | | 4/2016 |
| DE | 102007030925 | | 3/2020 |
| EP | 1029480 | | 8/2000 |
| EP | 1724069 | A2 | 11/2006 |
| EP | 2537641 | B1 | 9/2016 |
| EP | 2338650 | B1 | 10/2016 |
| GB | 2211486 | | 7/1989 |
| WO | WO2014/125484 | | 8/2014 |

* cited by examiner

MOUNTING RAILS FOR MODULAR SYSTEM

CROSS-REFERENCE TO RELATED PATENT APPLICATIONS

The present application is a continuation of International Application No. PCT/US2023/027263, filed on Jul. 10, 2023, which claims the benefit of and priority to U.S. Provisional Application No. 63/388,064, filed on Jul. 11, 2022, and U.S. Provisional Application No. 63/400,547, filed on Aug. 24, 2022, which are incorporated herein by reference in their entireties.

BACKGROUND OF THE INVENTION

The present disclosure is directed generally to the field of containers and related devices. The present disclosure relates specifically to support platforms configured to support and detachably couple to utility modules (e.g., units) within a modular system.

Tool storage units are often used to transport tools and tool accessories. Some storage units are designed to incorporate into a modular storage system. Various platforms can be configured to support units within a modular system, such as a platform for coupling units within a modular system to surfaces such as walls.

SUMMARY OF THE INVENTION

One embodiment of the invention relates to a support platform for a modular storage utility model including a first back plate including a plurality of apertures configured to couple the first back support to a wall, a first face plate coupled to the first back plate, the first face plate defining a plurality of apertures, the first back plate visible through the plurality of apertures, and a first plurality of female couplers. The first plurality of female couplers are collectively defined by the first back plate and the first face plate. Each of the first plurality of female couplers includes a recessed surface defined by the first back plate. Each of the first plurality of female couplers also includes a first rib and a second rib, the first rib and the second rib each extend above the recessed surface. Each of the first plurality of female couplers are configured to removably couple with male couplers of a first utility module.

Another embodiment of the invention relates to a mounting structure including a back plate. The back plate includes a first longitudinal sidewall, a second longitudinal sidewall opposing the first longitudinal sidewall, and a recessed surface extending between the first longitudinal sidewall and the second longitudinal sidewall. The back plate further including a plurality of apertures on the recessed surface, the plurality of apertures configured to couple the back plate to a surface such that the mounting structure is supported from the surface. The mounting structure further includes a face plate and a plurality of female couplers. The face plate is coupled to the back plate and defines a plurality of apertures. The plurality of female couplers are collectively defined by the back plate and the face plate. Each of the plurality of female couplers includes a recessed surface defined by the back plate, a first rib, and a second rib. The first rib and the second rib each extend over the back plate. Each of the plurality of female couplers are configured to engage with male couplers of a first utility module.

Another embodiment of the invention relates to a method of forming a support platform for a utility module. In the method, a metal sheet is positioned on a mold. A first cutting force is applied to an upper surface of the metal sheet with a first stamping punch to cut an outer edge of the metal sheet in a shape of the mold to form a face plate. A second cutting force is applied to an upper surface of the face plate with a second stamping punch to cut a plurality of apertures out of the face plate. The face plate includes a plurality of protrusions extending into each of the apertures. The method further includes bending the plurality of protrusions to an angle relative to the upper surface of the face plate. The face plate is coupled to a back plate to form a support platform. The support platform includes a plurality of female couplers defined by the back plate and the face plate, the plurality of female couplers configured to removably couple with male couplers of a utility module.

In various embodiments, each of the first plurality of female couplers includes a back wall, a first sidewall, a second sidewall opposite the first sidewall, and a front wall opposite the back wall. The first rib extends from the back wall towards the front wall and the first rib extends from the first sidewall towards the second sidewall. The second rib extends from the back wall towards the front wall and the second rib extends from the second sidewall towards the first sidewall.

In various embodiments, the support platform includes a plurality of columns of the first plurality of female couplers, and a plurality of rows of the first plurality of female couplers perpendicular to the plurality of columns.

In various embodiments, the support platform includes a second back support including a plurality of apertures configured to couple the second back support to the wall, a second face plate coupled to the second back support, the second face plate defining a plurality of apertures, the second back support visible through the plurality of apertures, and a second plurality of female couplers collectively defined by the second back support and the second face plate. In various embodiments, a top of the second face plate interfaces with a bottom of the first face plate. In various embodiments, the support platform includes a plurality of columns of the first plurality of female couplers and the second plurality of female couplers, and a plurality of rows of the first plurality of female couplers and the second plurality of female couplers.

Another embodiment of the invention relates to a stamped mounting interface, such as a stamped metal mounting interface, for coupling to and supporting units within a modular system. In a specific embodiment, this design is unique uses a stamped face plate to position couplers, such as female couplers, for rail tiling alignment to reduce tolerance stacking.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
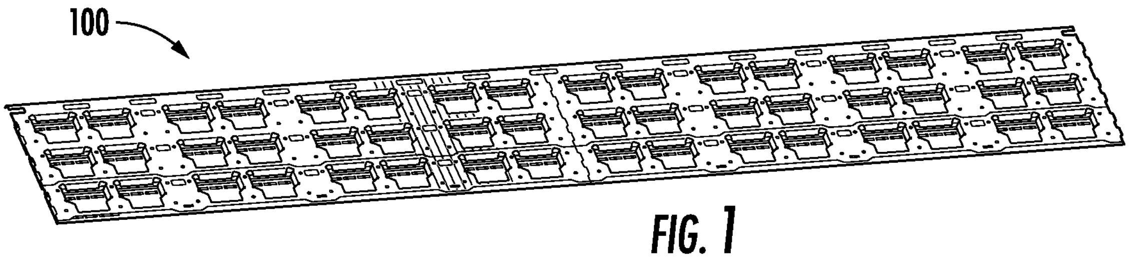
FIG. 1 is a perspective view of a support platform, according to an exemplary embodiment.

Referring generally to the figures, one or more support platforms that support utility modules within a modular system are shown. The support platforms include one or more back supports configure to attach to surfaces of a structure, such as walls. The support platforms provide coupling mechanisms, such as female couplers, to couple to utility modules with corresponding male couplers within a modular system. In use, the support platform is coupled to a surface, such as a wall, and one or more utility modules are coupled to the support platform via engagement between the male and female couplers.

In various embodiments, the support platform includes one or more stamped face plates. Applicant has observed that using a stamping process to manufacture the face plates provides a very high degree of shape and geometric consistency between individual stamped plates facilitating the stacking or tiling multiple face plates next to each other.

The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, beverage containers, etc., of any shape and size, and wherein any utility module can be detachably attached to the modular system.

Referring to FIGS. 1-4, various aspects of a mechanism, shown as support platform 110, for supporting and storing utility modules are shown. Support platform 110 includes face plate 130, face plate 131, lower plates 140, and back plates or supports 120. Back supports 120 are coupled to a back of each of the face plate 130, face plate 131, and lower plates 140. Support platform 110 includes a plurality of female couplers 160 configured to couple to male couplers of utility modules. In various embodiments, the face plate 130, 131, 140 is formed from a metal material. In a specific embodiment, the face plate 130, 131, 140 is formed from steel. In various embodiments, the face plate 130, 131, 140 is formed from a contiguous piece of metal material, and the plurality of female couplers 160 are stamped into the metal.

One or more face plates (e.g., face plate 131) include one or more latch recesses 137 configured to receive a latch extending from the utility module. When a latch from a utility module is engaged with a latch recess 137, the male couplers of the utility module are biased or prevented from disengaging from female couplers 160.

Figure 2:
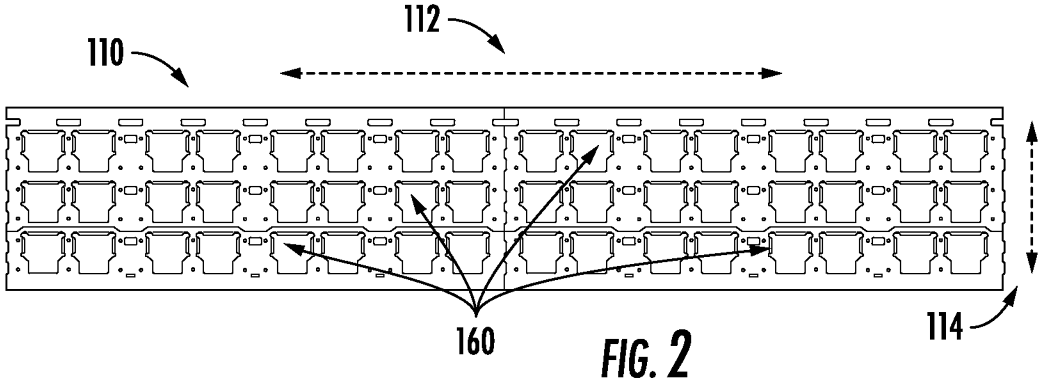
FIG. 2 is a front view of the support platform of FIG. 1, according to an exemplary embodiment.

Referring to FIG. 2, support platform 110 is expandable along both a horizontal or longitudinal axis 112 and a vertical or transverse axis 114, thereby enabling users to add an unlimited number of female couplers 160 to the support platform 110. As will be explained, one or more protrusions extend from a bottom of a face plate interfaces with one or more recesses defined by a top of a face plate to facilitate alignment between the face plates when both are secured to a wall. Similarly, one or more protrusions extend from a side of a face plate and the protrusion(s) interface with one or more recesses defined by an opposing side of another face plate to facilitate alignment between the face plates when both are secured to a wall.

Face plate 130 includes a plurality of apertures 136 arranged in a grid between top 132 and bottom 134 of face plate 130. Face plate 130 includes two rows of female couplers 160, so two back supports 120 are coupled to a rear of face plate 130. As will be explained, apertures 136 of face plate 130 and back supports 120 collectively define the plurality of female couplers 160.

Face plate 131 is functionally and structurally similar to face plate 130 except as described herein. In particular, face plate 131 only includes a single row of female couplers 160 and face plate 131 is approximately half as tall as face plate 130.

Lower face plate 140 is functionally and structurally similar to face plate 131 except as described herein. In particular, lower face plate 140 includes a top 142 with a recess 150 configured to receive and/or interface with protrusion 138 of upper face plate 130. In various embodiments, the protrusion 138 has a generally polygonal shape. In a specific embodiment, protrusion 138 has a trapezoidal shape. Lower face plate 140 includes apertures 146 arranged in a line, the apertures 146 being configured to partially define the female couplers 160. Lower face plate 140 also includes a protrusion 148 protruding downward, the protrusion 148 configured to interface with the recess of another lower face plate 140 placed below. In various embodiments, the protrusion 148 has a generally polygonal shape. In a specific embodiment, protrusion 148 has a trapezoidal shape In various embodiments, the female couplers 160 and the male couplers described and shown herein are compatible with the coupling mechanism(s) described in International Patent International Patent Publication No. WO 2017/191628, which is hereby incorporated by reference in its entirety.

Figure 3:
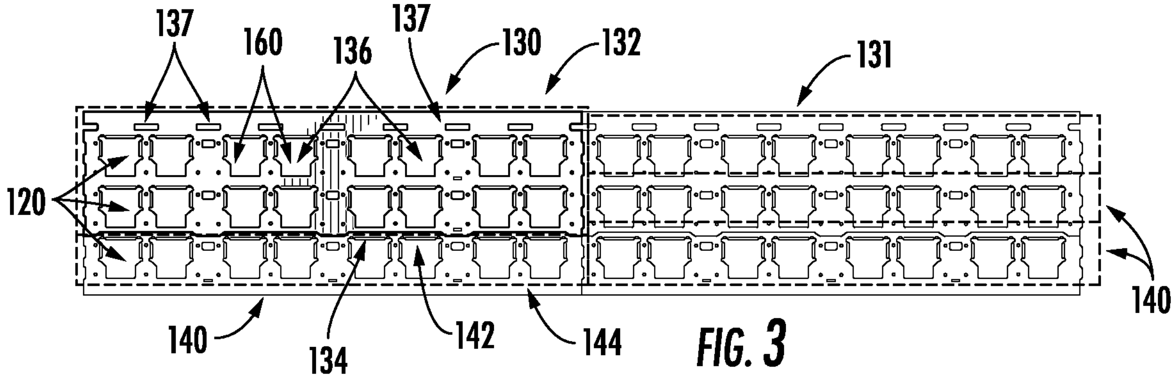
FIG. 3 is a front view of the support platform of FIG. 1, according to an exemplary embodiment.

Support platform 110 can include any number of face plates 130, face plates 131, lower plates 140, and back supports 120. Referring to FIG. 3, in a specific embodiment support platform 110 includes face plate 130 and a first lower face plate 140. A top 142 of first lower face plate 140 interfaces with a bottom 134 of face plate 130. Support platform 110 also includes face plate 131 interfacing with a right side of face plate 130. A second lower face plate 140 interfaces with a bottom of face plate 131, and a third lower face plate 140 interfaces with a bottom of second lower face plate 140 (e.g., a top 142 of third lower face plate 140 interfaces with a bottom 144 of second lower face plate 140).

Figure 4:
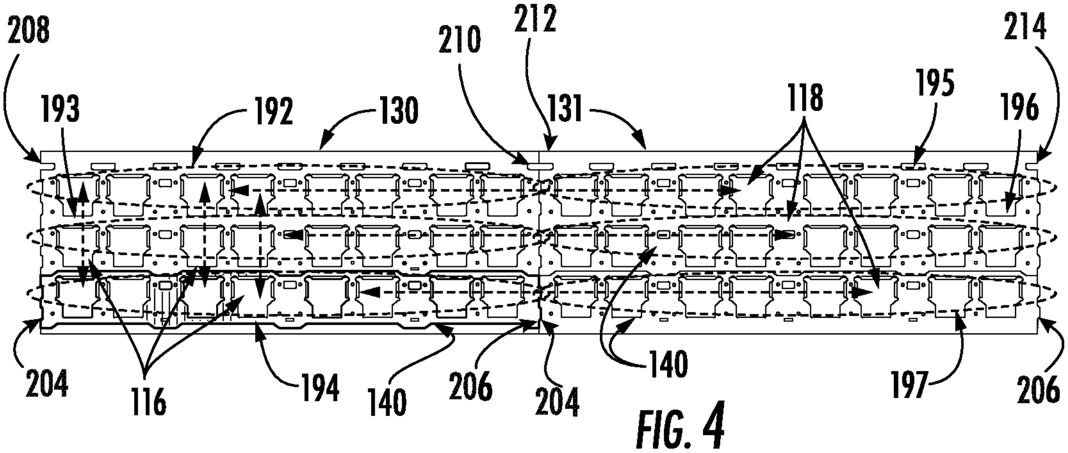
FIG. 4 is a front view of the support platform of FIG. 1, according to an exemplary embodiment.

Referring to FIG. 4, support platform 110 includes a plurality of female couplers 160. In particular, face plate 130 defines a first plurality 192 of female couplers 160 and a second plurality 193 of female couplers 160. Face plate 140 in the lower left corner of FIG. 4 defines a third plurality 194 of female couplers 160. Face plate 131 defines a fourth plurality 195 of female couplers 160. Face plate 140 in the center right of FIG. 4 defines a fifth plurality 196 of female couplers 160. Face plate 140 in the lower right corner of FIG. 4 defines a sixth plurality 197 of female couplers 160. In various embodiments, the female couplers 160 are arranged in a plurality of columns 116 and rows 118.

Face plate 130 extends between a first outer edge 208 and a second outer edge 210. First outer edge 208 and second outer edge 210 extend between top 132 and bottom 134 of face plate 130. In other words, first outer edge 208 and second outer edge 210 extend along vertical axis 114. Similarly, face plate 140 extends between a first outer edge 204 and a second outer edge 206. First outer edge 204 and second outer edge 206 extend between top 142 and bottom 144 of face plate 140. Face plate 131 extends between a first outer edge 212 and a second outer edge 214.

As shown in FIG. 4, face plate 130 is coupled to face plate 131 such that the first plurality 192 of female couples 160 are aligned with the fourth plurality 195 of female couplers 160. When face plate 130 and face plate 131 are arranged in such an orientation, second outer edge 210 of face plate 130 engages with and/or interfaces against first outer edge 212 of face plate 131. Similarly, face plate 140 in the lower right corner of FIG. 4 and the sixth plurality 197 of female couplers 160 are aligned with face plate 140 in the lower left corner of FIG. 4 and the third plurality 194 of female couplers 160. Second outer edge 206 of face plate 140 in the lower left corner engages with and/or interfaces against first outer edge 204 of face plate 140 in the lower right corner. In such an arrangement, a horizontal axis 112 of the first face plate 140 is collinear with a second horizontal axis 112 of the second face plate 140.

Figure 5:
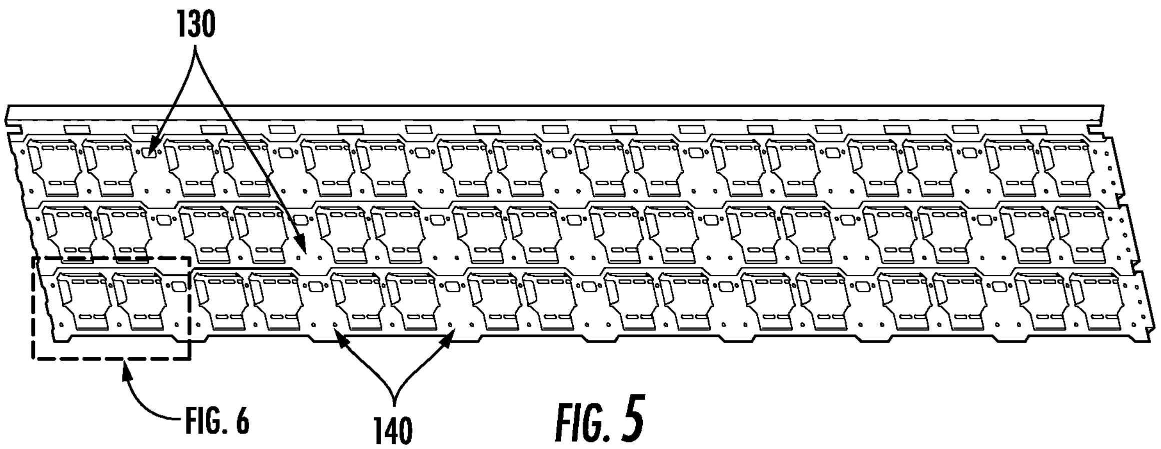
FIG. 5 is a perspective view of the support platform of FIG. 1, according to an exemplary embodiment.
Figure 6:
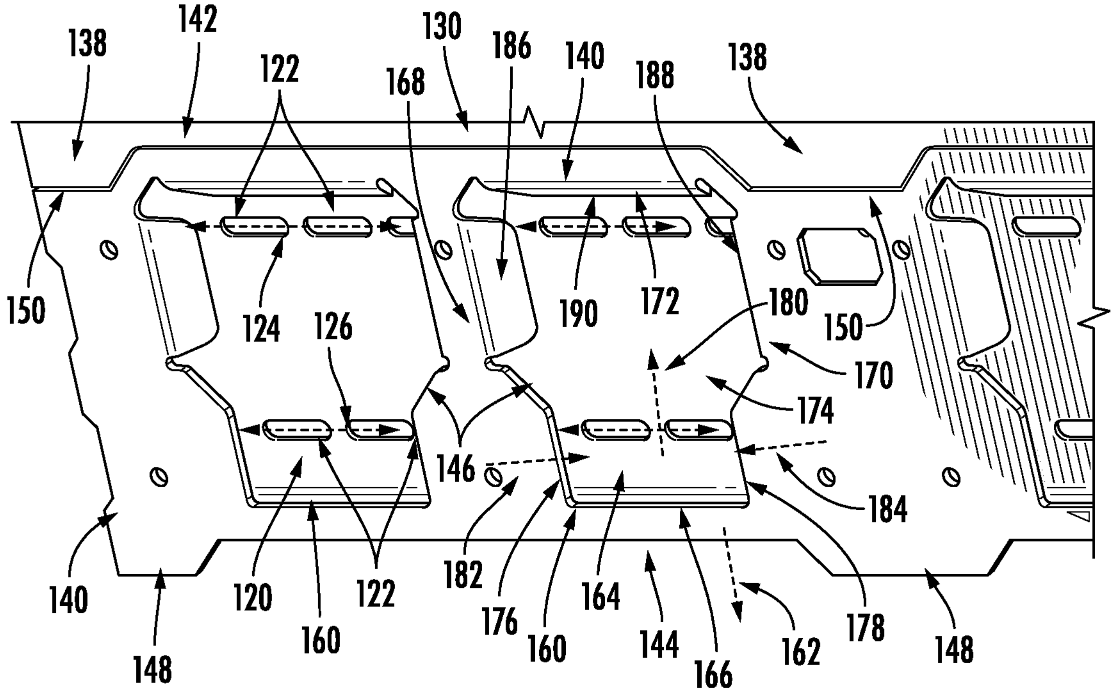
FIG. 6 is a detailed perspective view of the support platform of FIG. 1, according to an exemplary embodiment.
Figure 7:
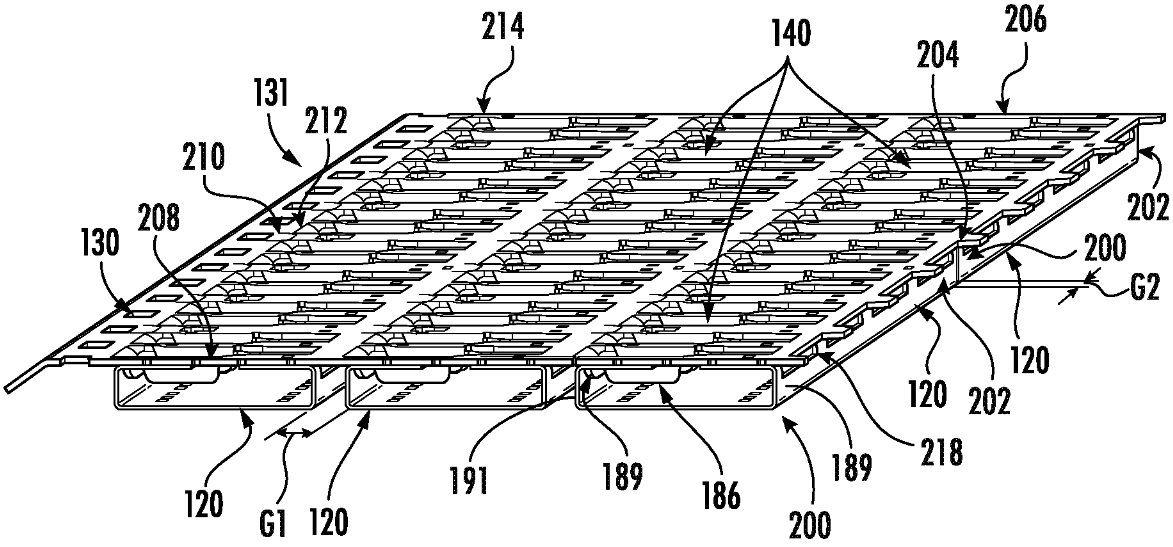
FIG. 7 is a perspective view from the side of the support platform of FIG. 1, according to an exemplary embodiment.
Figure 8:
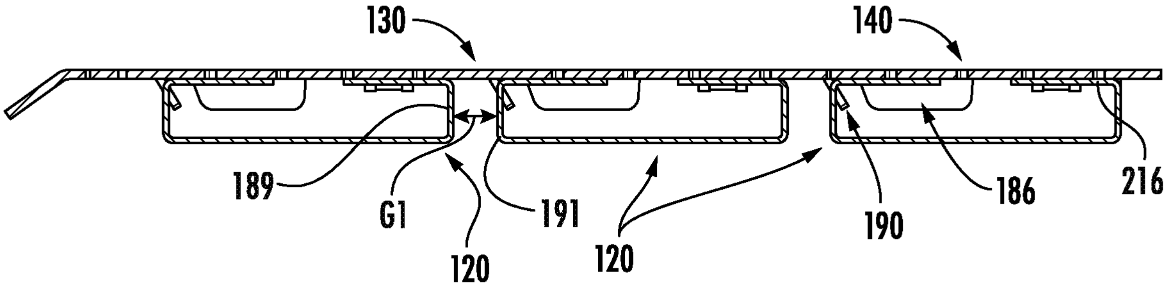
FIG. 8 is a side view of the support platform of FIG. 1, according to an exemplary embodiment.
Figure 9:
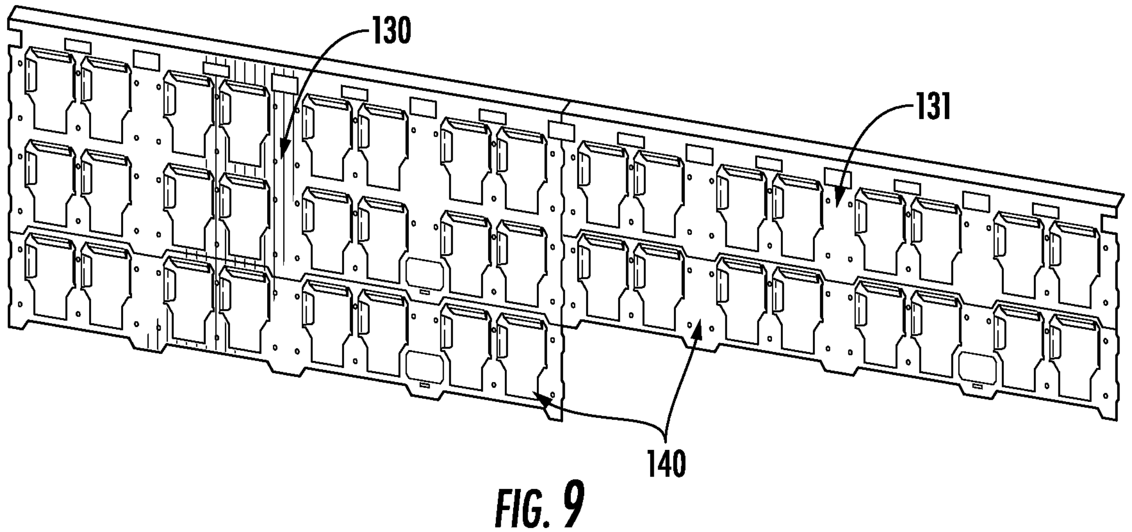
FIG. 9 is a perspective view of a portion of the support platform of FIG. 1, according to an exemplary embodiment.
Figure 10:
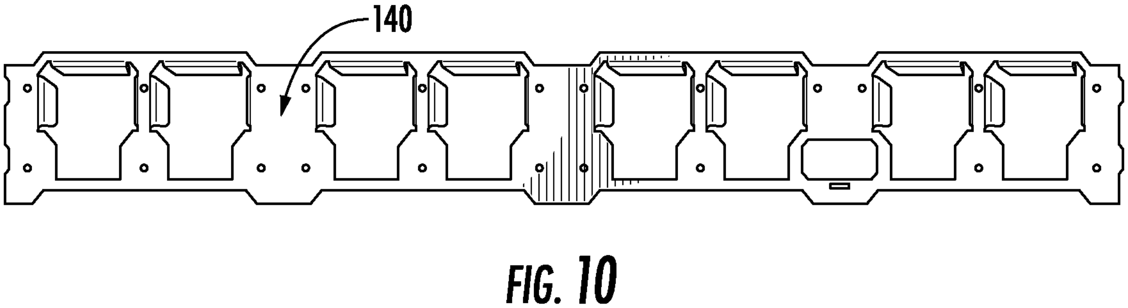
FIG. 10 is a perspective view of a portion of the support platform of FIG. 1, according to an exemplary embodiment.
Figure 11:
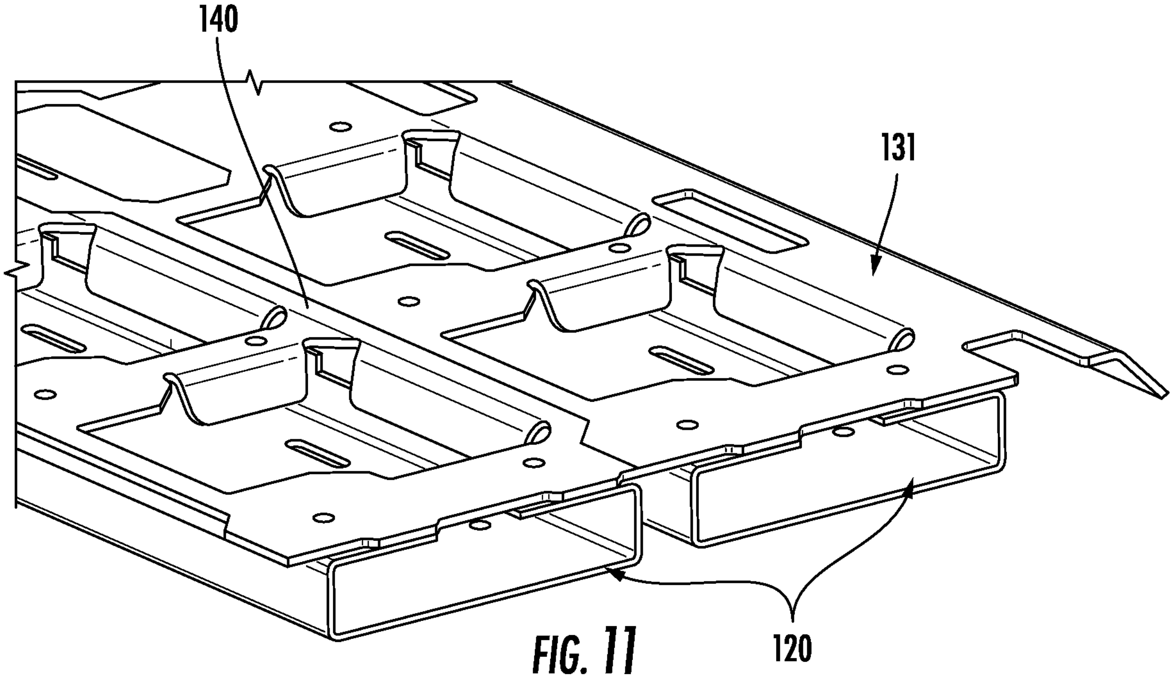
FIG. 11 is a perspective view of the support platform of FIG. 1, according to an exemplary embodiment.

Referring to FIGS. 5-6, various aspects of support platform 110 are shown. As can be seen, female couplers 160 are defined by back support(s) 120 and the apertures of one of face plates 130, 131 or lower face plate 140.

Referring to FIG. 6, various aspects of female coupler 160 are shown. Female coupler 160 includes a recessed surface 164 defined by back support 120. Back wall 166, opposing front wall 172, first sidewall 168, and opposing second sidewall 170 extend around female coupler 160. Female coupler 160 includes a pocket 174 collectively defined by recessed surface 164, back wall 166, front wall 172, first sidewall 168, and second sidewall 170.

First rib 176 extends from back wall 166 and first sidewall 168 above pocket 174 and/or recessed surface 164. In particular, first rib 176 extends in direction 182 from first sidewall 168 and first rib 176 extends in direction 180 from back wall 166. Second rib 178 extends from back wall 166 and second sidewall 170 above pocket 174 and/or recessed surface 164. In particular, second rib 178 extends in direction 184 from second sidewall 170 and second rib 178 extends in direction 180 from back wall 166.

First lateral protrusion 186 extends downward from first sidewall 168 towards recessed surface 164. Second lateral protrusion 188 extends downward from second sidewall 170 towards recessed surface 164. Back protrusion 190 extends downward from back wall 166 towards recessed surface 164. First lateral protrusion 186, second lateral protrusion 188, and/or back protrusion 190 facilitate single cleat locking mechanisms (e.g., rotating male couplers) coupling to one of the female couplers 160.

To couple female coupler 160 to a male coupler, the male coupler moves in direction 162 with respect to the female coupler 160. First lateral protrusion 186, second lateral protrusion 188, and/or back protrusion 190 interface with the male coupler to facilitate the male coupler engaging with and/or disengaging with the female coupler 160.

Back support 120 includes a plurality of coupling mechanism, shown as apertures 122, configured to couple back support 120 to a surface, such as a wall. In various embodiments, apertures 122 are arranged in a first line 124 at an upper portion of back support 120 and a second line 126 at a lower portion of back support 120. In such an embodiment, the first line 124 is spaced from second line 126 by a distance. In a specific embodiment, the first line 124 and the second line 126 of apertures 122 extend along horizontal axis 112. In use, users couple the back support 120 to a wall (e.g., via a stud in the wall) with a fastener or anchor, such as a bolt or screw, through apertures 122 in first line 124 and/or second line 126.

Referring to FIGS. 7-11, various aspects of support platform 110 are shown. As will be described in greater detail below. in a specific embodiment, face plate 130, face plate 131, and/or face plate 140 are manufactured from 2.5 mm thick steel and are made with two stamping operations. First, a hit will cut the entire outside edge of the part in a "blanking" operation. As will be generally understood, blanking differs from punching or piercing types of stamping in that the cut piece is the required portion of the metal piece instead of the cut or removed metal being a scrap piece. Second, a stamping hit will cut out the cleat pockets, locker pockets, and possibly any holes needed for welding. The cleat pocket tabs (e.g., protrusions 186, 188, 190) will be bent in a separate operation.

In various embodiments, back support 120 is another stamped piece of steel that is bent and then welded onto the back of the face plates 130, 131, 140. Back support 120 has rows of slots (e.g., apertures 122) for mounting to walls. In various embodiments back support 120 is a lower grade of steel or thinner compared to the face plates 130, 131, 140. The punched out areas between bent tabs (e.g., protrusions 186, 188, 190) are for clearance of PACKOUT™ accessory cleats into the cleat pockets of the face plate. In various embodiments, back support 120 is welded to the face plates 130, 131, 140 in the bent tab areas. The height of each of back supports 120 away from the wall and its tolerance aligns the face plates 130, 131, and 140 from one rail (e.g., combination of a face plate 130, 131, 140 and a back support 120) to the next allowing the system to tile. In various embodiments where the plurality of female couplers 160 are arranged in rows, a number of rows of the female couplers 160 will be the same as a number of back supports 120 coupled to the face plate 130, 131, 140.

Back support 120 includes a first longitudinal sidewall 189 extending along horizontal axis 112 and a second longitudinal sidewall 191 extending in a generally parallel orientation (i.e., parallel plus or minus 10 degrees) to the first longitudinal sidewall 189. Recessed surface 164 extends between the first longitudinal sidewall 189 and the second longitudinal sidewall 191. A plurality of apertures 122 extend through recessed surface 164. Apertures 122 are configured to couple the back support 120 to a surface such that the support platform 110 is supported from the surface.

The first longitudinal sidewall 189 and second longitudinal sidewall 191 each extend between a first end 200 and a second end 202 of back support 120. Back support 120 further includes a plurality of tabs 216 extending inward (i.e., toward the opposing longitudinal sidewall) from first longitudinal sidewall 189 and second longitudinal sidewall 191. The plurality of tabs 216 include openings 218 positioned between adjacent tabs 216, with the openings 218 positioned along horizontal axis 112. Openings 218 ensure tabs 216 do not extend into the space of pocket 174 collectively defined by recessed surface 164, back wall 166, front wall 172, first sidewall 168, and second sidewall 170.

When a face plate 130 includes a plurality of female couplers 160 arranged in a first row and a second row, the first row and the second row each extend along the horizontal axis 112 of face plate 130. A first back support 120 is positioned behind the first row of the plurality of female couplers 160 and the second back support 130 is positioned behind the second row of the plurality of female couplers 160. In such an embodiment, a second longitudinal sidewall 191 of the first back support 120 is generally parallel (i.e., parallel plus or minus 10 degrees) a first longitudinal sidewall 189 of the second back support 120.

Back support 120 is undersized vertically and horizontally compared to the face plate 130, 131, 140. In various embodiments, back supports 120 do not touch each other when vertically or horizontally tiling rails. In such an embodiment, at least a portion of the face plate 130, 131, 140 extends beyond the corresponding back support 120 in a vertical direction (i.e., along vertical axis 114) and in a horizontal direction (i.e., along horizontal axis 112). In other words, face plates 130, 131, 140 have a major or longitudinal dimension that is greater than a major or longitudinal dimension of back support 120. In a specific embodiment, the first outer edge 208 of face plate 130 extends beyond first end 200 of back support 120 second outer edge 210 of face plate 130 extends beyond second end 202 of back support 120. Similarly, face plates 130, 131, 140 have a minor or transverse dimension that is greater than a minor or transverse dimension of back support 120.

In particular, a first gap, shown as G1 is positioned between the first longitudinal sidewall 189 and the second longitudinal sidewall 191 of an adjacent back support 120. In other words, G1 provides a space between the adjacent back supports 120 such that adjacent back supports 120 do not touch each other along vertical axis 114. Similarly, a second gap, shown as G2 is positioned between the first end 200 and second end 202 of adjacent back supports 120. As such G2 provides a space between back supports 120 that are adjacent to each other along horizontal axis 112. In various embodiments this arrangement helps with the tolerance stack and permits excluding bends and material thicknesses from the stacks.

Figure 12:
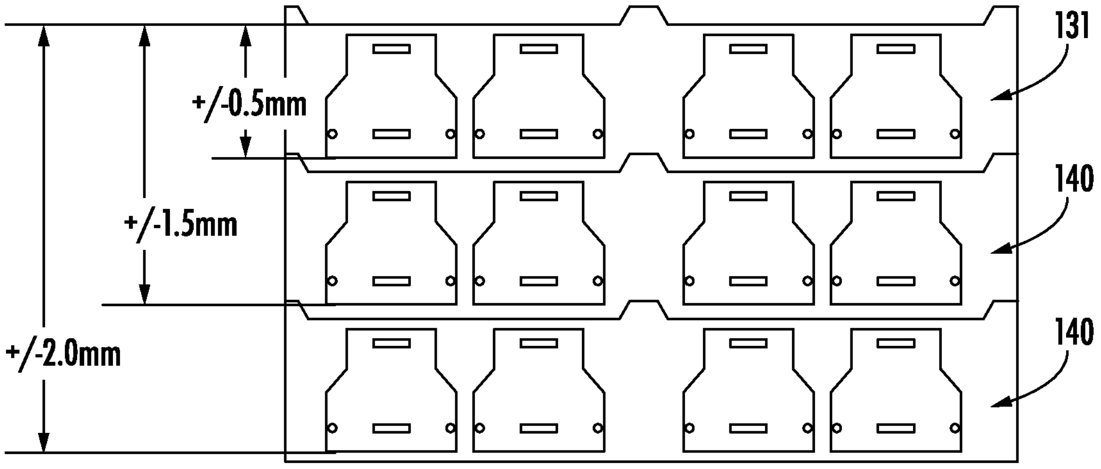
FIG. 12 is a schematic front view of the support platform of FIG. 1, according to an exemplary embodiment.

Referring to FIG. 12, the tolerance from the first cleat to the second cleat below is +/−1.5 mm, and the tolerance from the first cleat to the third cleat below is +/−2.0 mm.

Figure 13:
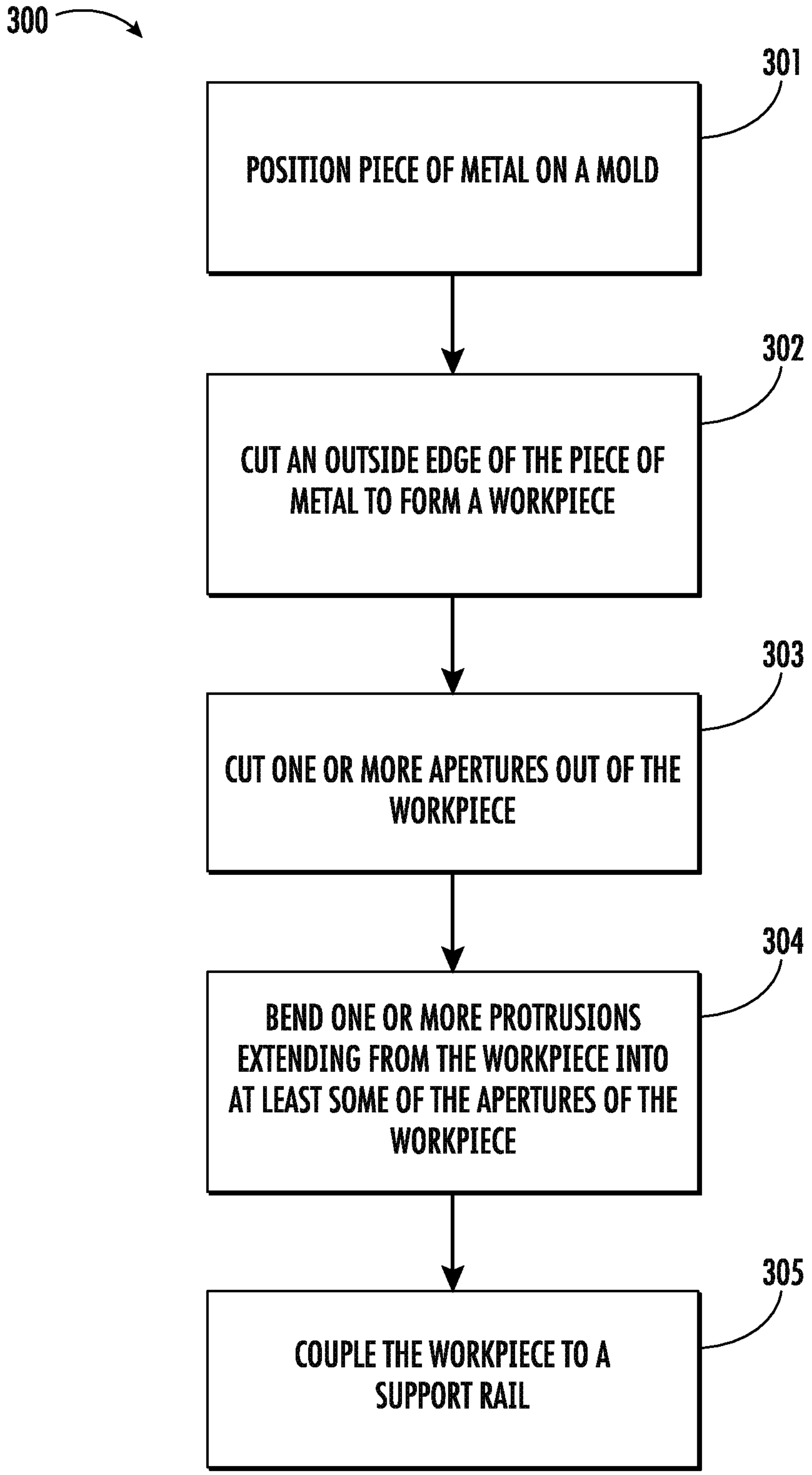
FIG. 13 is a flow diagram of a method of forming a support platform, according to an exemplary embodiment.

FIG. 13 provides a flow diagram of a method 300 for forming a support platform 110 according to the present disclosure. In a first step 301 of the method 300, a piece and/or sheet of metal is positioned on a die or mold. In a specific embodiment, the metal sheet is a 2.5 mm thick steel sheet. In particular, the metal sheet is positioned on the die such that the outside edges of the metal sheet are aligned with the die for stamping.

In a second step 302 of method 300, a first punch is used to apply a force to the metal sheet, the shearing or cutting force creates a cut along an outside edge of the metal sheet in a blanking operation to form a workpiece or face plate 130, 131, 140. In a specific embodiment, the first punch is used to cut along the entire outside edge of the metal sheet. The shape of the die determines the shape of the workpiece.

In a third step 303 of method 300, a second punch is used to apply a force to the workpiece cutting one or more apertures 136, 146 out of the workpiece 130, 131, 140. In a specific embodiment, the second punch applies a force to cut a plurality of apertures 136, 146 that at least partially define female couplers 160. In various specific embodiments, the second punch applies the force to cut a plurality of apertures 136, 146 that at least partially define female couplers 160 in a row (i.e., along horizontal axis 112) and/or a column (i.e., along vertical axis 114). In a specific embodiment, each aperture 136, 146 includes at least one protrusion 186, 188, 190 extending from the face plate 130, 131, 140 into the space of the aperture.

In various specific embodiments, the second punch cuts a plurality of apertures 136, 146 that at least partially define female couplers 160 and a plurality of latch recesses 137. In such an embodiment, the plurality of latch recesses 137 are positioned in a row (i.e., along horizontal axis 112) along the face plate 130, 131, 140. The latch recesses 137 are configured to receive a latch extending from the utility model. In various embodiments, the second punch applies a force to cut the plurality of apertures 136, 146 that at least partially define female couplers 160, the plurality of latch recesses 137 and a plurality of holes. As will be discussed below, such holes can be used to couple the face plate 130, 131, 140 to the back support 120.

In the fourth step 304 of method 300, a die is used to bend one or more of the protrusions 186, 188, 190 extending from the face plate 130, 131, 140 into the open space of the aperture 136, 146 that at least partially defines the female coupler 160. In particular, the one or more protrusions 186, 188, 190 are bent downward relative to an upper surface of the face plate 130, 131, 140 to an angle. In a specific embodiment, the protrusions 186, 188, 190 are bent to an angle between 30 and 90 degrees from the upper, outward facing surface of the face plate 130, 131, 140, specifically between 40 and 80 degrees, and more specifically between 50 and 70 degrees. In such an embodiment, the protrusions 186, 188, 190 are bent to an angle of about 60 degrees (i.e., 60 degrees plus or minus 5 degrees).

In a fifth step 305 of method 300, the back support 120 is coupled to the face plate 130, 131, 140. In particular, an upper surface of back support 120 is coupled to a rear surface of face plate 130, 131, 140 such that the recessed surface 164 of back support 120 together with back wall 166, front wall 172, first sidewall 168, and second sidewall 170 of face plate 130, 131, 140 defines the pocket 174. In a specific embodiment, face plate 130, 131, 140 is welded to back support 120. In such an embodiment, holes will have been punched in the face plate 130, 131, 140 in positions as needed to allow for the welding.

Before coupling back support 120 to face plate 130, 131, 140, back support 120 is aligned below the plurality of apertures 136, 146 that are arranged in a row. Aligning back support 120 ensures that back support 120 does not touch or engage with adjacent back supports coupled to the same face plate 130, 131, 140 or to an adjacent face plate 130, 131, 140.

When back support 120 is coupled to face plate 130, 131, 140 to form support platform 110, the support platform 110 includes a plurality of female couplers 160 defined by back support 120 and the face plate 130, 131, 140. Each of the female couplers 160 includes a recessed surface 164 defined by the back support 120 and an edge of each of the plurality of apertures 136, 146 of the face plate includes a first rib 176 and a second rib 178. The first rib 176 and second rib 178 extend above the recessed surface 164.

In various embodiments, back support 120 is a stamped piece of metal. In a specific embodiment, back support is formed from steel. In various specific embodiments, back support 120 is formed from a lower grade steel than the steel used to form face plate 130, 131, 140. In a specific embodiment, the metal used to form the back support has a thickness less than a thickness of the metal sheet used to form the face plate 130, 131, 140. In other words, in such an embodiment, the metal sheet used to form back support 120 is less than 2.5 mm in thickness.

In a specific embodiment, a third punch is used to apply a force to the metal sheet cutting one or more apertures 136, 146 out of the back support workpiece. In a specific embodiment, the third punch applies a force to cut a plurality of slots or apertures 122 into the metal sheet. In various embodiments, the third punch applies a force to cut apertures 122 arranged in a first line 124 and a second line 126 into the back support workpiece. Once the back support workpiece is bent into the desired shape, the face plate 130, 131, 140 can be coupled to the fully formed back support 120.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A support platform for a modular storage utility module comprising:

a first back plate comprising a plurality of apertures configured to couple the first back plate to a wall;

a first face plate coupled to the first back plate, the first face plate defining a plurality of apertures, the first back plate visible through the plurality of apertures; and a first plurality of female couplers collectively defined by the first back plate and the first face plate, each of the first plurality of female couplers comprising:

a recessed surface defined by the first back plate;

a first rib; and a second rib;

wherein the first rib and the second rib each extend above the recessed surface, and each of the first plurality of female couplers are configured to removably couple with male couplers of a first utility module;

wherein each of the first plurality of female couplers comprises:

a back wall;

a first sidewall;

a second sidewall opposite the first sidewall; and a front wall opposite the back wall;

wherein the first rib extends from the back wall towards the front wall and the first rib extends from the first sidewall towards the second sidewall, and wherein the second rib extends from the back wall towards the front wall and the second rib extends from the second sidewall towards the first sidewall.

2. The support platform of claim 1, wherein the first plurality of female couplers include a row of female couplers and a column of female couplers, the column of female couplers perpendicular to the row of female couplers.

3. The support platform of claim 2, further comprising a plurality of rows of the first plurality of female couplers and a plurality of columns of the first plurality of female couplers.

4. The support platform of claim 1, comprising:

a second back plate comprising a plurality of apertures configured to couple the second back plate to the wall;

a second face plate coupled to the second back plate, the second face plate defining a plurality of apertures, the second back plate visible through the plurality of apertures; and a second plurality of female couplers collectively defined by the second back plate and the second face plate, each of the second plurality of female couplers comprising:

a recessed surface defined by the second back plate;

a first rib; and a second rib;

wherein the first rib and the second rib each extend above the recessed surface, and each of the second plurality of female couplers are configured to removably couple with male couplers of the first utility module.

5. The support platform of claim 4, wherein a top of the second face plate interfaces with a bottom of the first face plate along a horizontal axis of the support platform.

6. The support platform of claim 5, wherein the top of the second face plate includes one or more recesses configured to receive and engage with one or more protrusions on the bottom of the first face plate.

7. The support platform of claim 4, wherein, when the first face plate is coupled to the second face plate, a first horizontal axis of the first face plate is parallel to a second horizontal axis of the second face plate.

8. The support platform of claim 4, comprising:

a third back plate comprising a plurality of apertures configured to couple the third back plate to the wall;

a third face plate coupled to the third back plate, the third face plate defining a plurality of apertures, the third back plate visible through the plurality of apertures; and a third plurality of female couplers collectively defined by the third back plate and the third face plate, each of the third plurality of female couplers comprising:

a recessed surface defined by the third back plate;

a first rib; and a second rib;

wherein the first rib and the second rib each extend above the recessed surface, and each of the third plurality of female couplers are configured to removably couple with male couplers of the first utility module;

wherein the first face plate extends between a first outer edge and a second outer edge;

wherein the third face plate extends between a first outer edge and a second outer edge; and wherein the first outer edge of the third face plate interfaces with the second outer edge of the first face plate such that a first horizontal axis of the first face plate is collinear with a second horizontal axis of the third face plate.

9. The support platform of claim 1, wherein the first face plate is a contiguous piece of metal material, and the first plurality of female couplers are stamped into the metal material.

10. A mounting structure comprising:

a back plate, the back plate comprising:

a first longitudinal sidewall;

a second longitudinal sidewall opposing the first longitudinal sidewall;

a recessed surface extending between the first longitudinal sidewall and the second longitudinal sidewall; and a plurality of apertures on the recessed surface, the apertures configured to couple the back plate to a surface such that the mounting structure is supported from the surface;

a face plate coupled to the back plate, the face plate defining a plurality of apertures; and a plurality of female couplers collectively defined by the back plate and the face plate, each of the plurality of female couplers comprising:

a recessed surface defined by the back plate;

a first rib; and a second rib;

wherein the first rib and the second rib each extend over the back plate, and each of the plurality of female couplers are configured to engage with male couplers of a first utility module;

the face plate extending between a first edge and a second edge opposing the first edge; and the first longitudinal sidewall and the second longitudinal sidewall extending between a first end of the back plate and a second end of the back plate;

wherein the first edge of the face plate extends beyond the first end of the back plate; and wherein the second edge of the face plate extends beyond the second end of the back plate.

11. The mounting structure of claim 10, wherein the plurality of female couplers are arranged in a first row and a second row, the first row and the second row extending along a horizontal axis of the face plate.

12. The mounting structure of claim 11, wherein the back plate comprises:

a first back plate; and a second back plate; and wherein the first back plate is positioned behind the first row of the plurality of female couplers and the second back plate is positioned behind the second row of the plurality of female couplers.

13. The mounting structure of claim 12, wherein a second longitudinal sidewall of the first back plate is parallel to a first longitudinal sidewall of the second back plate, and wherein a gap extends between the second longitudinal sidewall of the first back plate and the first longitudinal sidewall of the second back plate.

14. The mounting structure of claim 10, wherein each of the plurality of female couplers comprises:

a back wall;

a first sidewall;

a second sidewall opposite the first sidewall; and a front wall opposite the back wall;

wherein the first rib extends from the back wall towards the front wall and the first rib extends from the first sidewall towards the second sidewall, and wherein the second rib extends from the back wall towards the front wall and the second rib extends from the second sidewall towards the first sidewall.

15. A method of forming a support platform for a utility module, comprising:

positioning a metal sheet on a mold;

applying a first cutting force to an upper surface of the metal sheet with a first stamping punch to cut an outer edge of the metal sheet in a shape of the mold to form a face plate;

applying a second cutting force to an upper surface of the face plate with a second stamping punch to cut a plurality of apertures out of the face plate, wherein the face plate includes a plurality of protrusions extending into each of the apertures;

bending the plurality of protrusions to an angle relative to the upper surface of the face plate; and coupling the face plate to a back plate to form a support platform, the support platform including a plurality of female couplers defined by the back plate and the face plate, the female couplers configured to removably couple with male couplers of a utility module.

16. The method of forming a support platform of claim 15, wherein each of the female couplers comprise:

a recessed surface defined by the back plate;

an edge of each of the plurality of apertures of the face plate comprises:

a first rib; and a second rib, the first rib and the second rib extending above the recessed surface.

17. The method of forming a support platform of claim 15, further comprising aligning the back plate below a plurality of apertures arranged in a row.

18. The method of forming a support platform of claim 15, the step of applying the second cutting force further comprising the second stamping punch cutting a plurality of latch recesses, the latch recesses configured to receive a latch extending from the utility module.

19. A mounting structure comprising:

a back plate, the back plate comprising:

a first longitudinal sidewall;

a second longitudinal sidewall opposing the first longitudinal sidewall;

a recessed surface extending between the first longitudinal sidewall and the second longitudinal sidewall; and a plurality of apertures on the recessed surface, the apertures configured to couple the back plate to a surface such that the mounting structure is supported from the surface;

a face plate coupled to the back plate, the face plate defining a plurality of apertures; and a plurality of female couplers collectively defined by the back plate and the face plate, each of the plurality of female couplers comprising:

a recessed surface defined by the back plate;

a first rib; and a second rib;

wherein the first rib and the second rib each extend over the back plate, and each of the plurality of female couplers are configured to engage with male couplers of a first utility module;

wherein each of the plurality of female couplers comprises:

a back wall;

a first sidewall;

a second sidewall opposite the first sidewall; and a front wall opposite the back wall; and wherein the first rib extends from the back wall towards the front wall and the first rib extends from the first sidewall towards the second sidewall, and wherein the second rib extends from the back wall towards the front wall and the second rib extends from the second sidewall towards the first sidewall.

* * * * *